US012792220B2

(12) United States Patent
Verma et al.

(10) Patent No.: US 12,792,220 B2
(45) Date of Patent: Nov. 10, 2026

(54) DETECTING BLOCK SWITCHING DURING BACKGROUND OPERATIONS TO IMPROVE SEQUENTIAL WRITE PERFORMANCE

(71) Applicant: Micron Technology, Inc., Boise, ID (US)

(72) Inventors: Kapil Verma, San Jose, CA (US); Dheeraj Srinivasan, San Jose, CA (US); Edric Goh, Singapore (SG)

(73) Assignee: Micron Technology, Inc., Boise, ID (US)

( * ) Notice: Subject to any disclaimer, the term of this patent is extended or adjusted under 35 U.S.C. 154(b) by 21 days.

(21) Appl. No.: 18/954,833

(22) Filed: Nov. 21, 2024

(65) Prior Publication Data

US 2025/0199690 A1 Jun. 19, 2025

Related U.S. Application Data

(60) Provisional application No. 63/609,956, filed on Dec. 14, 2023.

(51) Int. Cl.
*G06F 3/06* (2006.01)

(52) U.S. Cl.
CPC .......... *G06F 3/0613* (2013.01); *G06F 3/0659* (2013.01); *G06F 3/0679* (2013.01)

(58) Field of Classification Search
CPC ..... G06F 3/0613; G06F 3/0659; G06F 3/0679
See application file for complete search history.

(56) References Cited

U.S. PATENT DOCUMENTS

| | | | | |
|---|---|---|---|---|
| 9,881,675 | B2 * | 1/2018 | Siciliani | G06F 12/06 |
| 10,712,965 | B2 * | 7/2020 | Sandberg | G06F 12/1027 |
| 11,188,459 | B2 * | 11/2021 | Muchherla | G06F 9/544 |
| 11,899,971 | B2 * | 2/2024 | Ning | G06F 3/0604 |
| 11,977,752 | B2 * | 5/2024 | Lu | G06F 3/0634 |
| 12,217,781 | B2 * | 2/2025 | Hoya | G06F 3/0604 |
| 2011/0032774 | A1 * | 2/2011 | Yan | G11C 16/24 365/189.011 |
| 2018/0189155 | A1 * | 7/2018 | Gunnam | G06F 3/0658 |
| 2022/0050772 | A1 * | 2/2022 | Muchherla | G06F 12/0877 |

* cited by examiner

*Primary Examiner* — Aracelis Ruiz
(74) *Attorney, Agent, or Firm* — Lowenstein Sandler LLP

(57) ABSTRACT

A memory device includes a memory array and control logic, operatively coupled to the memory array, to perform operations including causing a first write operation to be performed to write host data to a first cache block of the memory array, detecting, during the first write operation, a block address change reflecting block switching to write the host data to a second cache block of the memory array, after detecting the block address change, determining whether the first write operation is complete, and in response to determining that the first write operation is complete, initiating a second write operation to write the host data to the second cache block.

20 Claims, 8 Drawing Sheets

DETECTING BLOCK SWITCHING DURING BACKGROUND OPERATIONS TO IMPROVE SEQUENTIAL WRITE PERFORMANCE

CROSS-REFERENCE TO RELATED APPLICATION(S)

The present application claims priority to U.S. Provisional Patent Application No. 63/609,956, filed on Dec. 14, 2023, the entire contents of which are hereby incorporated by reference herein.

TECHNICAL FIELD

Embodiments of the disclosure relate generally to memory sub-systems, and more specifically, relate to detecting block switching during background operations to improve sequential write performance.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1A:
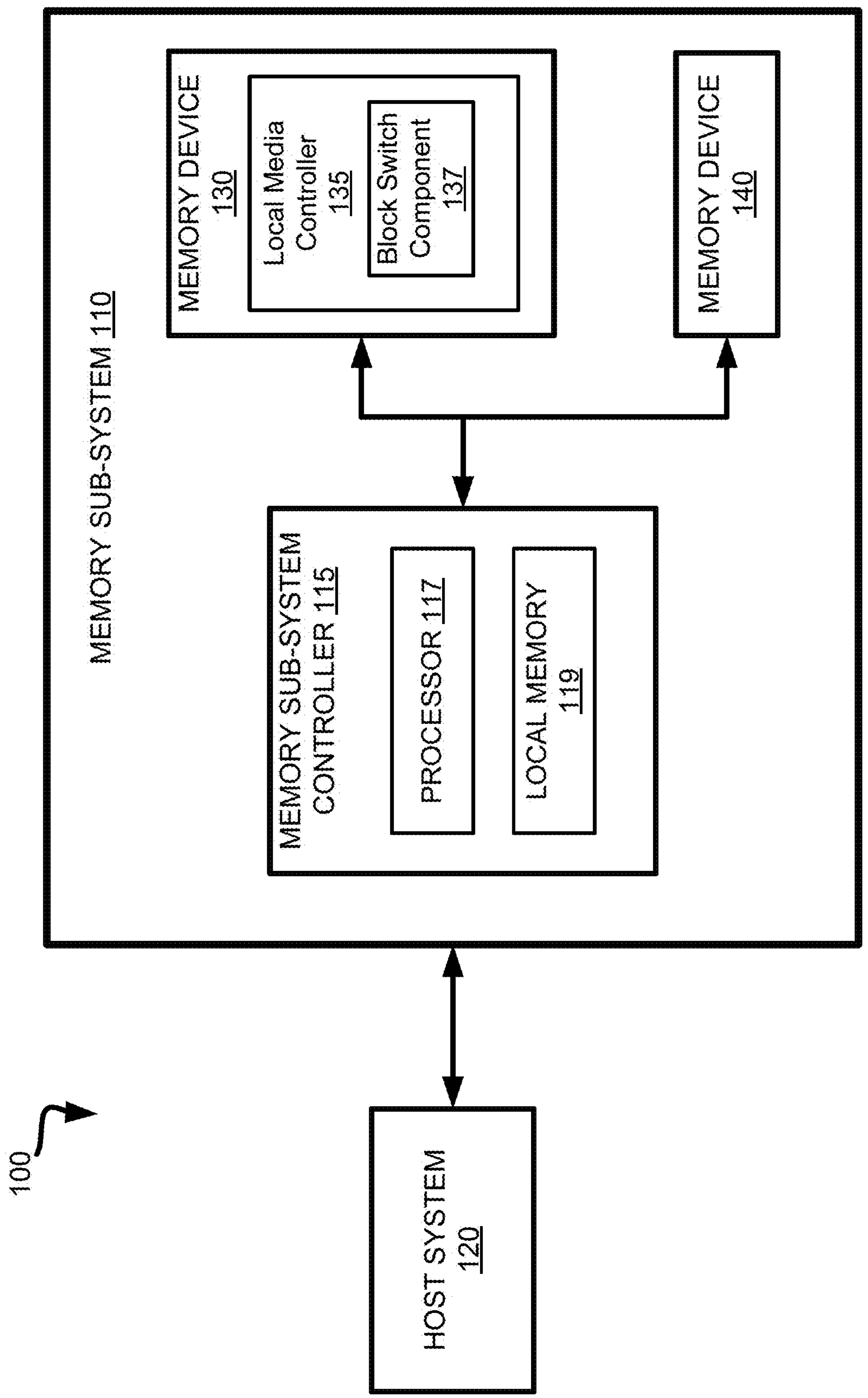
FIG. 1A illustrates an example computing system that includes a memory sub-system in accordance with some embodiments of the present disclosure.

Aspects of the present disclosure are directed to detecting block switching during background operations to improve sequential write performance. A memory sub-system can be a storage device, a memory module, or a combination of a storage device and memory module. Examples of storage devices and memory modules are described below in conjunction with FIG. 1A. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a not-and (NAND) memory device. Other examples of non-volatile memory devices are described below in conjunction with FIG. 1A. A non-volatile memory device is a package of one or more dies. Each die can include one or more planes. For some types of non-volatile memory devices (e.g., NAND devices), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1," or combinations of such values.

A memory device can be arranged in a two-dimensional or a three-dimensional grid. Memory cells are formed onto a silicon wafer in an array of A wordline can have a row of associated memory cells in a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane. A block of data can correspond to one or more data addresses in the memory device (e.g., a block, a plurality of blocks, a plurality of cells, etc.). The memory device can include circuitry that performs concurrent memory page accesses of two or more memory planes. For example, the memory device can include multiple access line driver circuits and power circuits that can be shared by the planes of the memory device to facilitate concurrent access of pages of two or more memory planes, including different page types. For ease of description, these circuits can be generally referred to as independent plane driver circuits. Depending on the storage architecture employed, data can be stored across the memory planes (i.e., in stripes). Accordingly, one request to read a block of data can result in read operations performed on two or more of the memory planes of the memory device.

A memory cell ("cell") can be programmed (written to) by applying a certain voltage to the memory cell, which results in an electric charge being held by the cell. For example, a voltage signal $V_{CG}$ that can be applied to a control electrode of the cell to open the cell to the flow of electric current across the cell, between a source electrode and a drain electrode. More specifically, for each individual memory cell (having a charge Q stored thereon) there can be a threshold control gate voltage $V_T$ (herein also referred to as the "threshold voltage" or simply as "threshold") such that the source-drain electric current is low for the control gate voltage ($V_{CG}$) being below the threshold voltage, $V_{CG}<V_T$. The current increases substantially once the control gate voltage has exceeded the threshold voltage, $V_{CG}>V_T$. Because the actual geometry of the electrodes and gates varies from cell to cell, the threshold voltages can be different even for cells implemented on the same die. The memory cells can, therefore, be characterized by a distribution P of the threshold voltages, $P(Q,V_T)=dW/dV_T$, where dW represents the probability that any given cell has its threshold voltage within the interval $[V_T,V_T+dV_T]$ when charge Q is placed on the cell.

A memory device can have distributions $P(Q,V_T)$ that are narrow compared with the working range of control voltages tolerated by the cells of the device. Accordingly, multiple non-overlapping distributions $P(Q_k, V_T)$ ("valleys") can be fit into the working range allowing for storage and reliable detection of multiple values of the charge $Q_k$, k=1, 2, 3 . . . . The distributions (valleys) are interspersed with voltage intervals ("valley margins") where none (or very few) of the memory cells of the device have their threshold voltages. Such valley margins can, therefore, be used to separate various charge states $Q_k$—the logical state of the cell can be determined by detecting, during a read operation, between which two valley margins the respective threshold voltage $V_T$ of the cell resides. Specifically, the read operation can be performed by comparing the measured threshold voltage $V_T$ exhibited by the memory cell to one or more reference voltage levels corresponding to known valley margins (e.g., centers of the margins) of the memory device.

One type of memory cell ("cell") is a single level cell (SLC), which stores 1 bit per cell and defines 2 logical states ("states") ("1" or "L0" and "0" or "L1") each corresponding to a respective $V_T$ level. For example, the "1" state can be an erased state and the "0" state can be a programmed state (L1). Another type of cell is a multi-level cell (MLC), which stores 2 bits per cell and defines 4 states ("11" or "L0", "10" or "L1", "01" or "L2" and "00" or "L3") each corresponding to a respective $V_T$ level. For example, the "11" state can be an erased state and the "01", "10" and "00" states can each be a respective programmed state. Another type of cell is a triple level cell (TLC), which stores 3 bits per cell and defines 8 states ("111" or "L0", "110" or "L1", "101" or "L2", "100" or "L3", "011" or "L4", "010" or "L5", "001" or "L6", and "000" or "L7") each corresponding to a respective $V_T$ level. For example, the "111" state can be an erased state and each of the other states can be a respective programmed state. Another type of a cell is a quad-level cell (QLC), which stores 4 bits per cell and defines 16 states L0-L15, where L0 corresponds to "1111" and L15 corresponds to "0000". Another type of cell is a penta-level cell (PLC), which stores 5 bits per cell and defines 32 states. Other types of cells are also contemplated. Thus, an n-level cell can use $2^n$ levels of charge to store n bits. A memory device can include one or more arrays of memory cells such as SLCs, MLCs, TLCs, QLCs, PLCs, etc. or any combination of such. For example, a memory device can include an SLC portion, and an MLC portion, a TLC portion, a QLC portion, or a PLC portion of memory cells.

A valley margin can also be referred to as a read window. For example, in a SLC cell, there is 1 read window that exists with respect to the 2 $V_T$ distributions. As another example, in an MLC cell, there are 3 read windows that exist with respect to the 4 $V_T$ distributions. As yet another example, in a TLC cell, there are 7 read windows that exist with respect to the 8 $V_T$ distributions. Read window size generally decreases as the number of states increases. For example, the 1 read window for the SLC cell can be larger than each of the 3 read windows for the MLC cell, and each of the 3 read windows for the MLC cell can be larger than each of the 7 read windows for the TLC cell etc. Read window budget (RWB) refers to the cumulative value of the read windows.

Some memory sub-systems (e.g., SSDs) implement a caching architecture for storing data received from a host device. More specifically, a memory sub-system can include a cache including a set of cache blocks, which include first XLC cells of a first type. Data written to the cache can eventually be written to a target block including second XLC cells of a second type. An XLC cell refers to an x-level cell that stores x-bits of state information per cell, where x is a positive integer. For example, an XLC cell can be an SLC cell, an MLC cell, a TLC cell, a QLC cell, a PLC cell, etc., as described above.

The first XLC cells can store fewer bits of state information per cell than the second XLC cells of the target block. In some embodiments, the first XLC cells include SLC cells ("SLC cache") and the second XLC cells include non-SLC cells. For example, the second XLC cells can include QLC cells ("QLC block"). In such an example, one bit stored in SLC cache can take up the same amount of space as four bits stored in a QLC target block.

The size of the cache (e.g., SLC cache) can be selected in view of physical memory device constraints. For example, the size of the cache can have a fixed size that does not exceed the available number of blocks on the memory device (e.g., NAND). The cache can include a static cache having a fixed logical saturation size ("fixed size") and/or a dynamic cache having a dynamic (e.g. modifiable or configurable) maximum logical saturation size ("dynamic maximum size"). Logical saturation refers to a portion of logical locations (e.g., LBAs) that contain data (e.g., a ratio of the size of the logical locations that contain data to the total size of the logical locations). Thus, logical saturation can refer to an amount of data logically written to the memory sub-system from the perspective of the host system. In contrast to logical saturation, physical saturation refers to a portion of physical locations (e.g., physical NAND locations) that contain data (e.g., a ratio of the size of the physical locations that contain data to the total size of the physical locations). The memory sub-system can utilize a cache behavior profile specifying at least one of: size rules of the cache (e.g., rules for increasing or decreasing the cache), usage rules of the cache, rules specifying the location of the cache, etc. The cache behavior profile may include a single configuration rule, or multiple rules. For example, an initial cache behavior profile may be loaded by a manufacturer onto the memory sub-system at the time of manufacture. The cache behavior profile can be a static profile that remains unchanged over time. For example, the initial cache behavior profile can persist through the life of the memory sub-system. Alternatively, the cache behavior profile can be a dynamic profile that can be updated or replaced with an updated cache behavior profile via a communications interface. For example, device usage characteristics may change (e.g., usage behavior of the device in which the memory sub-system is installed), and thus the host may replace the cache behavior profile over the communications interface. Illustratively, a smartphone may receive an over the air (OTA) update that specifies an updated SLC cache behavior profile that modifies the performance characteristics of the memory sub-system in response to a change in usage behavior of the smartphone.

A sequential write refers to writing or programming data to consecutive memory locations within a memory device. For example, when data is written sequentially, the data can be stored in consecutive pages or blocks without any intervening erases or random writes. Sequential writes can have advantages in terms of performance and efficiency for certain operations, as compared to random writes in which data is written to random (e.g., non-sequential) locations. For memory devices that support page-level writes and block-level erases (e.g., NAND memory devices), sequential writes can allow for more efficient programming and erasing of cells as compared to non-sequential writes. For example, when data is written sequentially, there is a greater chance for block structure alignment, which can reduce the need for frequent block erasures and can therefore improve overall write performance. Since each write to a block of a memory device can correlate to memory device wear, wear-level techniques can be used to distribute program/erase (P/E) cycles substantially evenly across cells of the memory device to increase the memory device lifespan.

A local media controller of a memory device can cause data to be written to a first block (e.g., a first cache block). In some embodiments, the first block is an SLC block. In some embodiments, the first block is an MLC block. In some embodiments, the first block is a TLC block. In some embodiments, the first block is a QLC block.

Block switching, also referred to as block jumping, refers to causing data writes to be switched from the first block to a second block (e.g., a second cache block). In some embodiments, the second block is an SLC block. In some embodiments, the second block is an MLC block. In some embodiments, the second block is a TLC block. In some embodiments, the second block is a QLC block. More specifically, a block switch can be identified by detecting a block address change to write data to the second block. A write operation to write data to the second block can be initiated after completion of the first write operation.

Block switching can be performed for various different reasons. For example, the memory sub-system controller may identify data as being hot data (e.g., frequently accessed or likely to be accessed data) and/or cold data (e.g., less frequently accessed or less likely to be accessed data). The memory sub-system controller can cause the hot data and the cold data to be stored in separate blocks (e.g., cache blocks), which can optimize memory device performance and lifespan. For example, separately storing hot data and cold data can help avoid unnecessary garbage collection and save total bytes written (TBW)).

For some sequential write implementations, however, the local media controller may wait for the memory device (e.g., die) to be in an idle state before receiving a block address change to initiate writes to the second block. A memory device is an idle state if there are no ongoing background operations being performed on a block. A memory device can be determined to be in an idle state based on status register bits. For example, the memory device can be in an idle state after a block that was written to has been sufficiently (e.g., fully) discharged. For example, a memory device can be determined to be in an idle state if an ARDY bit is set to 1 (ARDY=1). Having to wait for a memory device to be in an idle state before allowing any block switch (e.g., block address change), such as waiting for the first block to be discharged, can contribute to write operation overhead. For example, the discharge period corresponding to the amount of time it takes for the first block to be discharged can range from, e.g., about 7 microseconds to about 10 microseconds.

Aspects of the present disclosure address the above and other deficiencies by detecting block switching during background operations to improve sequential write performance. Embodiments described herein can improve sequential write performance by eliminating the need for the memory sub-system controller to wait for the memory device to be in an idle state, after writing data to a first block (e.g., first cache block), in order for the memory sub-system controller to send a command to the local media controller to write data to a second block (e.g., second cache block). In some embodiments, the memory device can be determined to be in a non-idle state if the ARDY bit is set to 0 (ARDY=0) and a RDY bit is set to 1 (RDY=1). The RDY bit indicates that the local media controller is ready to receive the next command from the memory sub-system controller. The local media controller can detect a block address change reflecting block switching during the background operation. Further details regarding detecting block address changes will be described herein below. Accordingly, data can be written to the second block before the first block is fully written. After determining that the first write operation is complete, the second write operation can be initiated to write data to the second block. For example, determining that the first operation is complete and can include determining that the first block is discharged. Further details regarding detecting block switching during background operations to improve sequential write performance will be described below with reference to FIGS. 1A-5.

Advantages of the present disclosure include, but are not limited to, improved memory device performance and reliability. For example, by permitting block switching when a memory device is in a non-idle state, embodiments described herein can decrease write operation overhead, improve cache efficiency, reduce complexity, etc. Embodiments described herein can be used to reduce complexity by enabling random cache (e.g., SLC cache) programming with a seamless cache architecture.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to program data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a not-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes block switch component 137 that can detect block switching during background operations to improve sequential write performance. In some embodiments, local media controller 135 includes at least a portion of block switch component 137 and is configured to perform the functionality described herein. In some embodiments, the memory sub-system controller 115 includes at least a portion of block switch component 137. In some embodiments, block switch component 137 is part of the host system 120, an application, or an operating system. Further details regarding block switch component 137 will be described below with reference to FIGS. 1B-5.

Figure 1B:
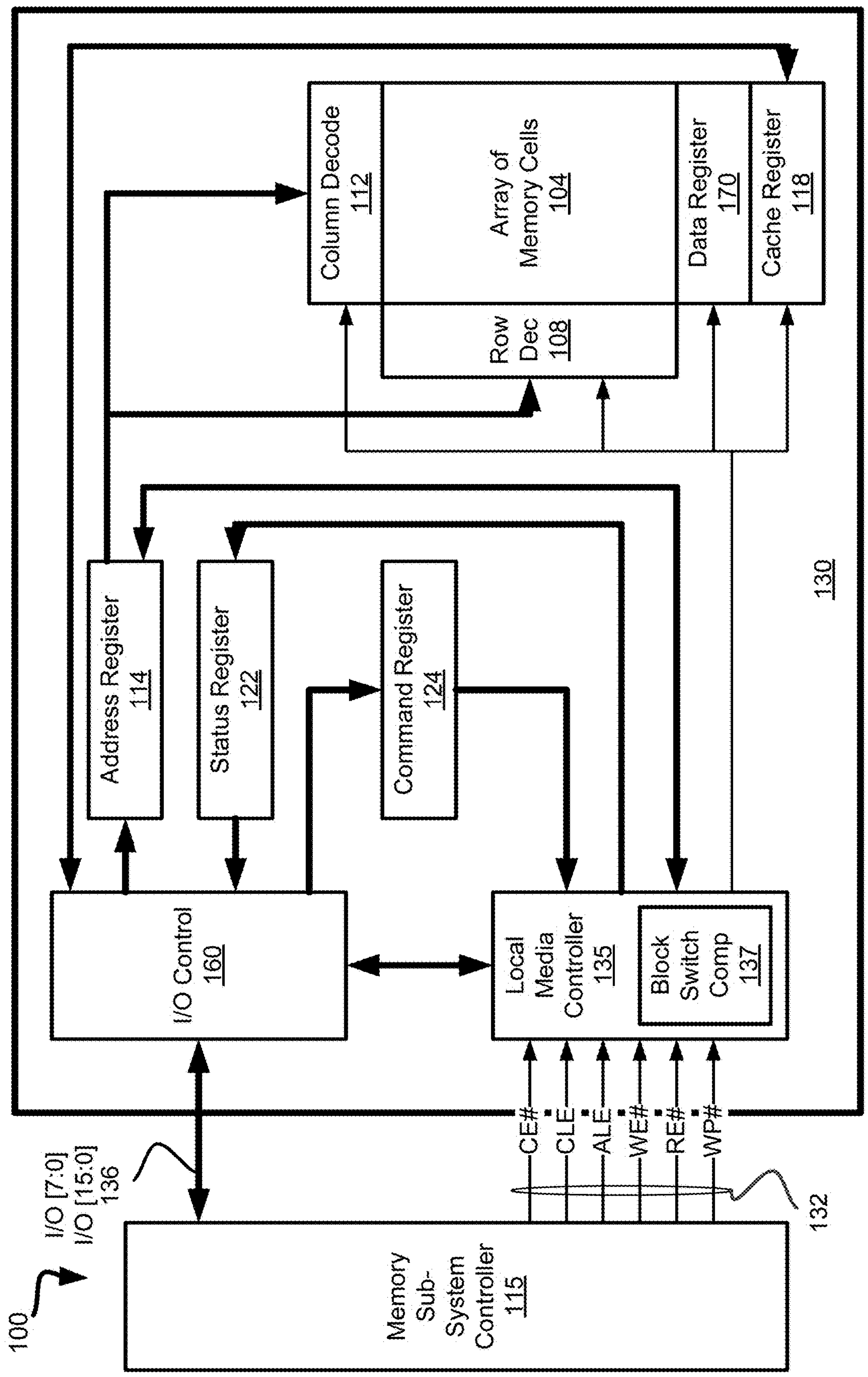
FIG. 1B illustrates an example block diagram of a memory device in communication with a memory sub-system controller of a memory sub-system, in accordance with some embodiments of the present disclosure.

FIG. 1B illustrates an example simplified block diagram of a first apparatus, in the form of a memory device 130, in communication with a second apparatus, in the form of a memory sub-system controller 115 of a memory sub-system (e.g., memory sub-system 110 of FIG. 1A), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), can be a memory controller or other external host device.

Memory device 130 includes an array of memory cells 104 logically arranged in rows and columns. Memory cells of a logical row are typically connected to the same access line (e.g., a wordline) while memory cells of a logical column are typically selectively connected to the same data line (e.g., a bit line). A single access line can be associated with more than one logical row of memory cells and a single data line can be associated with more than one logical column. Memory cells (not shown in FIG. 1B) of at least a portion of array of memory cells 104 are capable of being programmed to one of at least two target data states. In one embodiment, the array of memory cells 104 (i.e., a "memory array") can include a number of sacrificial memory cells used to detect the occurrence of read disturb in memory device 130, as described in detail herein.

Row decode circuitry 108 and column decode circuitry 109 are provided to decode address signals. Address signals are received and decoded to access the array of memory cells 104. Memory device 130 also includes input/output (I/O) control circuitry 160 to manage input of commands, addresses and data to the memory device 130 as well as output of data and status information from the memory device 130. An address register 114 is in communication with I/O control circuitry 160 and row decode circuitry 108 and column decode circuitry 109 to latch the address signals prior to decoding. A command register 124 is in communication with I/O control circuitry 160 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, program operations and/or erase operations) on the array of memory cells 104. The local media controller 135 is in communication with row decode circuitry 108 and column decode circuitry 109 to control the row decode circuitry 108 and column decode circuitry 109 in response to the addresses.

The local media controller 135 is also in communication with a cache register 172. Cache register 172 latches data, either incoming or outgoing, as directed by the local media controller 135 to temporarily store data while the array of memory cells 104 is busy writing or reading, respectively, other data. During a program operation (e.g., write operation), data can be passed from the cache register 172 to the data register 170 for transfer to the array of memory cells 104; then new data can be latched in the cache register 172 from the I/O control circuitry 160. During a read operation, data can be passed from the cache register 172 to the I/O control circuitry 160 for output to the memory sub-system controller 115; then new data can be passed from the data register 170 to the cache register 172. The cache register 172 and/or the data register 170 can form (e.g., can form a portion of) a page buffer of the memory device 130. A page buffer can further include sensing devices (not shown in FIG. 1B) to sense a data state of a memory cell of the array of memory cells 104, e.g., by sensing a state of a data line connected to that memory cell. A status register 122 can be in communication with I/O control circuitry 160 and the local memory controller 135 to latch the status information for output to the memory sub-system controller 115.

Memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) can be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 134 and outputs data to the memory sub-system controller 115 over I/O bus 134.

For example, the commands can be received over input/output (I/O) pins [7:0] of I/O bus 134 at I/O control circuitry 160 and can then be written into command register 124. The addresses can be received over input/output (I/O) pins [7:0] of I/O bus 134 at I/O control circuitry 160 and can then be written into address register 114. The data can be received over input/output (I/O) pins [7:0] for an 8-bit device or input/output (I/O) pins [15:0] for a 16-bit device at I/O control circuitry 160 and then can be written into cache register 172. The data can be subsequently written into data register 170 for programming the array of memory cells 104.

In an embodiment, cache register 172 can be omitted, and the data can be written directly into data register 170. Data can also be output over input/output (I/O) pins [7:0] for an 8-bit device or input/output (I/O) pins [15:0] for a 16-bit device. Although reference can be made to I/O pins, they can include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIG. 1B has been simplified. It should be recognized that the functionality of the various block components described with reference to FIG. 1B can not necessarily be segregated to distinct components or component portions of an integrated circuit device. For example, a single component or component portion of an integrated circuit device could be adapted to perform the functionality of more than one block component of FIG. 1B. Alternatively, one or more components or component portions of an integrated circuit device could be combined to perform the functionality of a single block component of FIG. 1B. Additionally, while specific I/O pins are described in accordance with popular conventions for receipt and output of the various signals, it is noted that other combinations or numbers of I/O pins (or other I/O node structures) can be used in the various embodiments.

Figure 2A:
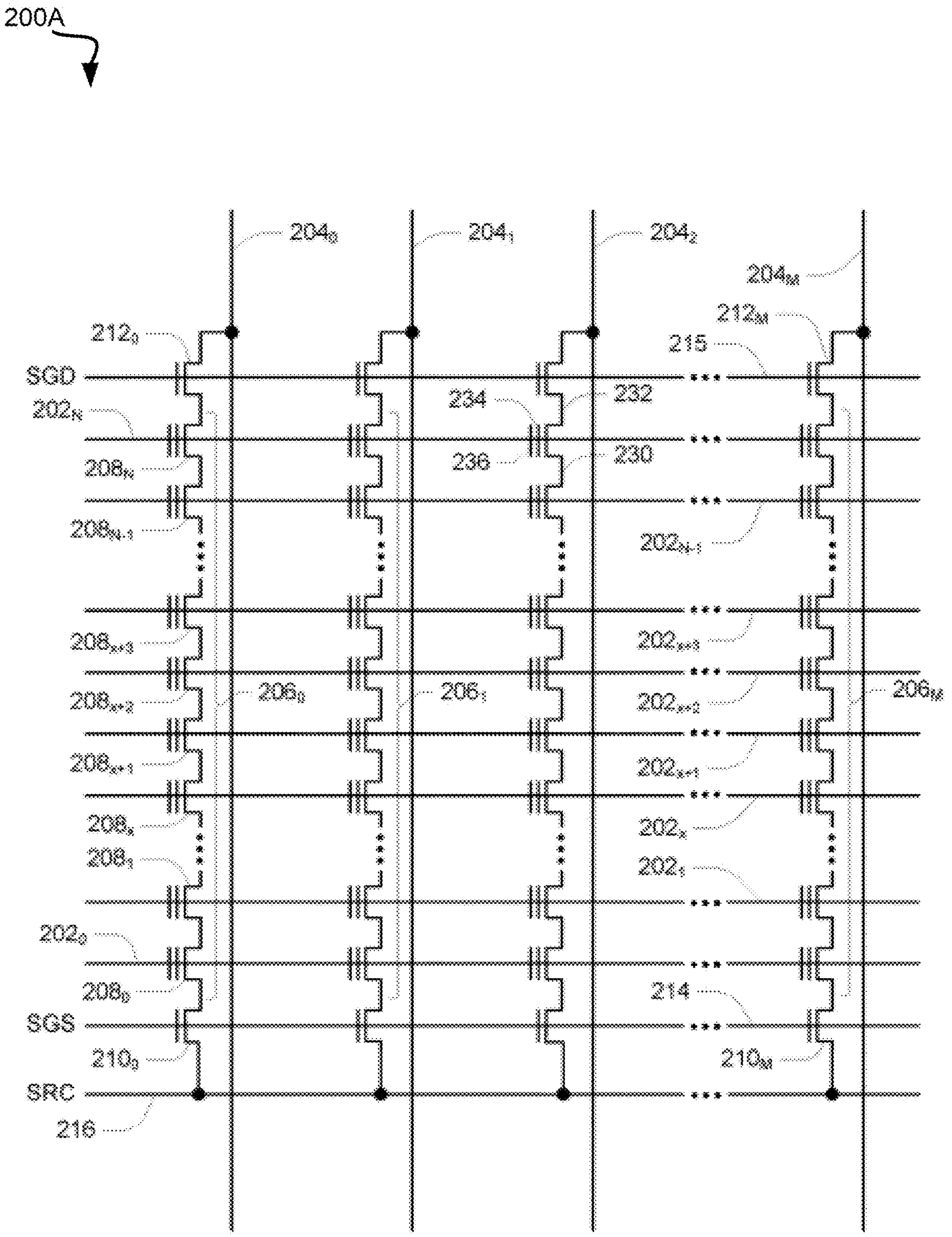
FIGS. 2A-2C are diagrams of portions of an example array of memory cells included in a memory device, in accordance with some embodiments of the present disclosure.
Figure 2B:
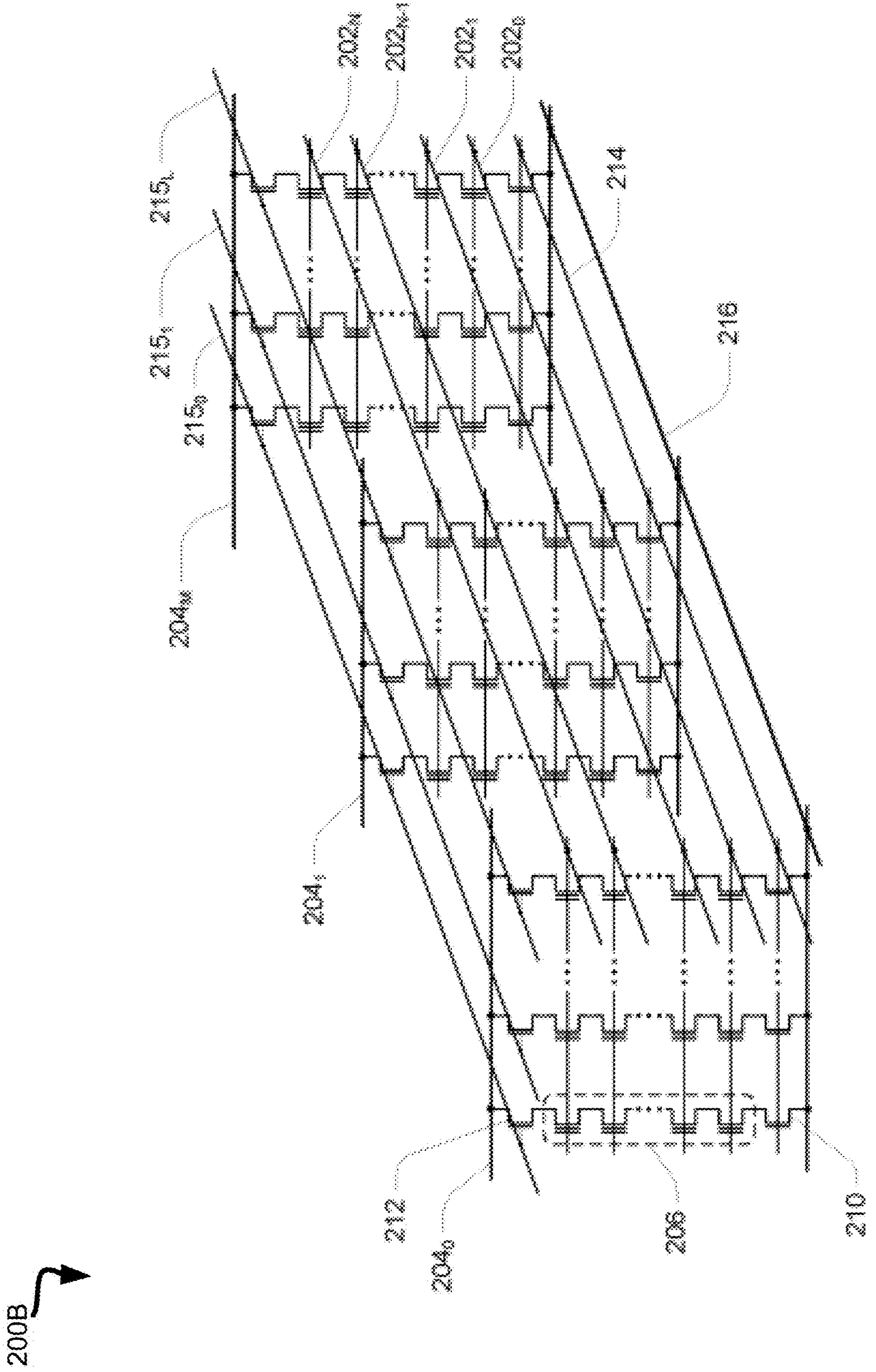
Figure 2C:
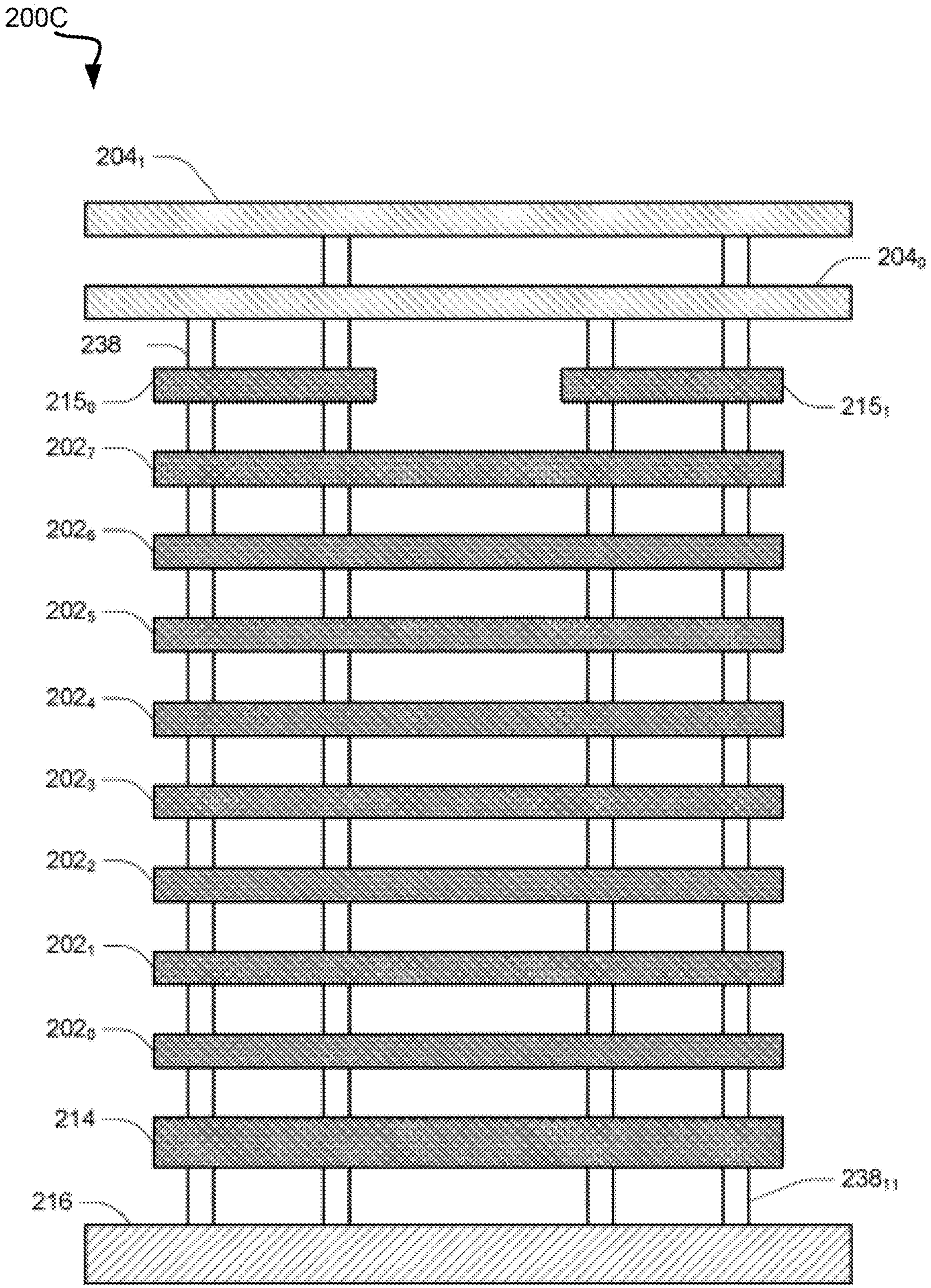

FIGS. 2A-2C are diagrams of portions of an example array of memory cells included in a memory device, in accordance with some embodiments of the present disclosure. For example, FIG. 2A is a schematic of a portion of an array of memory cells 200A as could be used in a memory device (e.g., as a portion of array of memory cells 104). Memory array 200A includes access lines, such as wordlines $\mathbf{202}_0$ to $\mathbf{202}_N$, and a data line, such as bitline 204. The wordlines 202 may be connected to global access lines (e.g., global wordlines), not shown in FIG. 2A, in a many-to-one relationship. For some embodiments, memory array 200A may be formed over a semiconductor that, for example, may be conductively doped to have a conductivity type, such as a p-type conductivity, e.g., to form a p-well, or an n-type conductivity, e.g., to form an n-well.

Memory array 200A can be arranged in rows each corresponding to a respective wordline 202 and columns each corresponding to a respective bitline 204. Rows of memory cells 208 can be divided into one or more groups of physical pages of memory cells 208, and physical pages of memory cells 208 can include every other memory cell 208 commonly addressable by a given wordline 202. For example, memory cells 208 commonly addressable by wordline $\mathbf{202}_N$ and selectively connected to even bitlines 204 (e.g., bitlines $\mathbf{204}_0$, $\mathbf{204}_2$, $\mathbf{204}_4$, etc.) may be one physical page of memory cells 208 (e.g., even memory cells) while memory cells 208 commonly addressable by wordline $\mathbf{202}_N$ and selectively connected to odd bitlines 204 (e.g., bitlines $\mathbf{204}_1$, $\mathbf{204}_3$, $\mathbf{204}_5$, etc.) may be another physical page of memory cells 208 (e.g., odd memory cells). Although bitlines $\mathbf{204}_3$-$\mathbf{204}_5$ are not explicitly depicted in FIG. 2A, it is apparent from the figure that the bitlines 204 of the array of memory cells 200A may be numbered consecutively from bitline $\mathbf{204}_0$ to bitline $\mathbf{204}_M$. Other groupings of memory cells 208 commonly addressable by a given wordline 202 may also define a physical page of memory cells 208. For certain memory devices, all memory cells commonly addressable by a given wordline might be deemed a physical page of memory cells. The portion of a physical page of memory cells (which, in some embodiments, could still be the entire row) that is read during a single read operation or programmed during a single program operation (e.g., an upper or lower page of memory cells) might be deemed a logical page of memory cells. A block of memory cells may include those memory cells that are configured to be erased together, such as all memory cells addressable by wordlines $\mathbf{202}_0$-$\mathbf{202}_N$ (e.g., all strings 206 sharing common wordlines 202). Unless expressly distinguished, a reference to a page of memory cells herein refers to the memory cells of a logical page of memory cells.

Each column can include a string of series-connected memory cells (e.g., non-volatile memory cells), such as one of strings $\mathbf{206}_0$ to $\mathbf{206}_M$. Each string 206 can be connected (e.g., selectively connected) to a source line 216 (SRC) and can include memory cells $\mathbf{208}_0$ to $\mathbf{208}_N$. The memory cells 208 of each string 206 can be connected in series between a select gate 210, such as one of the select gates $\mathbf{210}_0$ to $\mathbf{210}_M$, and a select gate 212, such as one of the select gates $\mathbf{212}_0$ to $\mathbf{212}_M$. In some embodiments, the select gates $\mathbf{210}_0$ to $\mathbf{210}_M$ are source-side select gates (SGS) and the select gates $\mathbf{212}_0$ to $\mathbf{212}_M$ are drain-side select gates. Select gates $\mathbf{210}_0$ to $\mathbf{210}_M$ can be connected to a select line 214 (e.g., source-side select line) and select gates $\mathbf{212}_0$ to $\mathbf{212}_M$ can be connected to a select line 215 (e.g., drain-side select line). The select gates 210 and 212 might represent a plurality of select gates connected in series, with each select gate in series configured to receive a same or independent control signal. A source of each select gate 210 can be connected to SRC 216, and a drain of each select gate 210 can be connected to a memory cell $\mathbf{208}_0$ of the corresponding string 206. Therefore, each select gate 210 can be configured to selectively connect a corresponding string 206 to SRC 216. A control gate of each select gate 210 can be connected to select line 214. The drain of each select gate 212 can be connected to the bitline 204 for the corresponding string 206. The source of each select gate 212 can be connected to a memory cell $\mathbf{208}_N$ of the corresponding string 206. Therefore, each select gate 212 might be configured to selectively connect a corresponding string 206 to the bitline 204. A control gate of each select gate 212 can be connected to select line 215.

In some embodiments, and as will be described in further detail below with reference to FIG. 2B, the memory array in FIG. 2A is a three-dimensional memory array, in which the strings 206 extend substantially perpendicular to a plane containing SRC 216 and to a plane containing a plurality of bitlines 204 that can be substantially parallel to the plane containing SRC 216.

FIG. 2B is another schematic of a portion of an array of memory cells 200B (e.g., a portion of the array of memory cells 104) arranged in a three-dimensional memory array structure. The three-dimensional memory array 200B may incorporate vertical structures which may include semiconductor pillars where a portion of a pillar may act as a channel region of the memory cells of strings 206. The strings 206 may be each selectively connected to a bit line $\mathbf{204}_0$-$\mathbf{204}_M$ by a select gate 212 and to the SRC 216 by a select gate 210. Multiple strings 206 can be selectively connected to the same bitline 204. Groups of strings 206 can be connected to their respective bitlines 204 by biasing the select lines 2150-215L to selectively activate particular select gates 212 each between a string 206 and a bitline 204. The select gates 210 can be activated by biasing the select line 214. Each wordline 202 may be connected to multiple rows of memory cells of the memory array 200B. Rows of memory cells that are commonly addressable by each other by a particular wordline 202 may collectively be referred to as tiers.

FIG. 2C is a diagram of a portion of an array of memory cells 200C (e.g., a portion of the array of memory cells 104). Channel regions (e.g., semiconductor pillars) 238 represent the channel regions of different strings of series-connected memory cells (e.g., strings 206 of FIGS. 2A-2B) selectively connected to the bitline $\mathbf{204}_0$ and/or bitline $\mathbf{204}_1$. A memory cell (not depicted in FIG. 2C) may be formed at each intersection of a wordline 202 and a channel region 238, and the memory cells corresponding to a single channel region 238 may collectively form a string of series-connected memory cells (e.g., a string 206 of FIGS. 2A-2B). Additional features might be common in such structures, such as dummy wordlines, blocked channel regions with interposed conductive regions, etc.

Figure 3A:
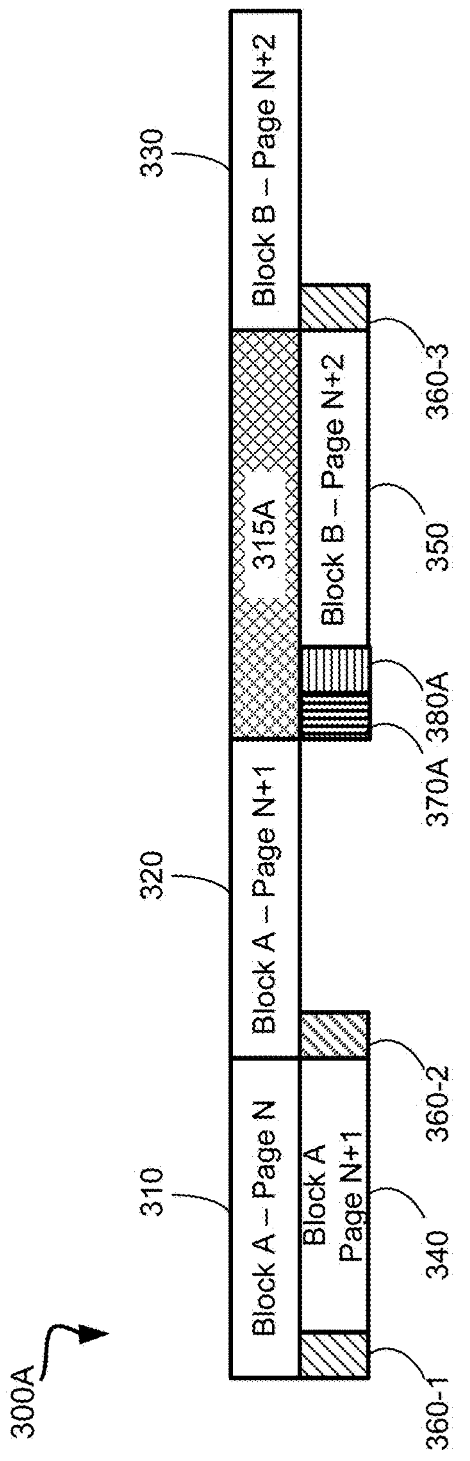
FIGS. 3A-3B are timing diagrams illustrating sequential writes, in accordance with some embodiments of the present disclosure.

FIG. 3A is a timing diagram ("diagram") 300A illustrating block switching detected after a background operation is complete, in accordance with some embodiments of the present disclosure. For example, diagram 300A shows a memory array including block A and block B. More specifically, diagram 300A shows Page 310 corresponding to Page N of Block A, Page 320 corresponding to Page N+1 of Block A, and Page 330 corresponding to Page N+2 of Block B. Diagram 300A further shows Command 340 to write data to Page 310A-1 and Command 350 to write data to Page 310B. Diagram 400A further shows cache busy signals (tCBSY) 360-1 through 360-3, Get Feature command 370A and Set Feature command 380A. In some embodiments, Get Feature command 370A designates feature address 7Fh and subfeature parameter P3. In some embodiments, Set Feature command 380A designates feature address 7Fh and subfeature parameter P1. Although Set Feature and Get Feature commands are shown in this example, such embodiments should not be considered limiting. For example, Set Feature command 380A can alternatively be or include a prefix command, an address cycle, etc. As shown, Command 350 is received (e.g., added to a queue) after a background operation to write data to Block A. The resulting delay 315A reflects performance loss.

Figure 3B:
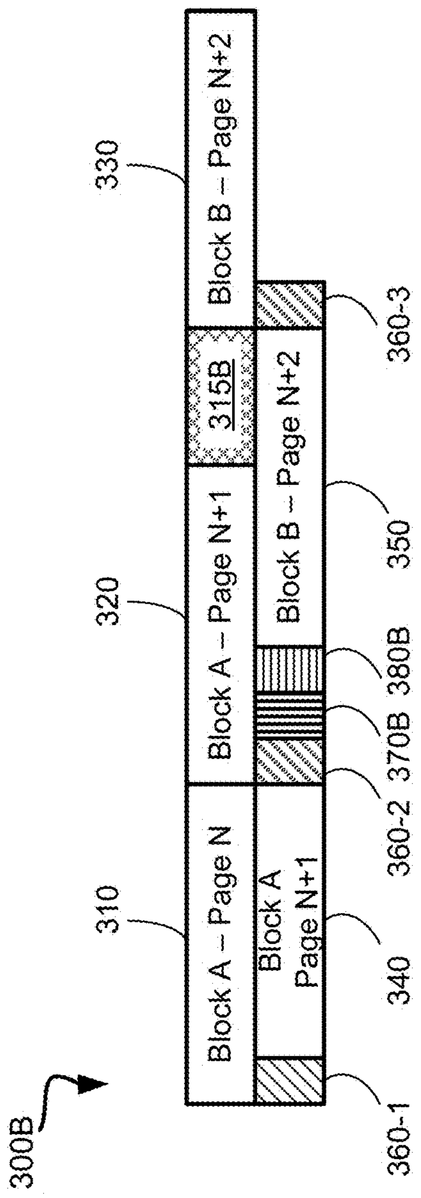

FIG. 3B is a timing diagram ("diagram") 300B illustrating block switching detected during a background operation to improve sequential write performance, in accordance with some embodiments of the present disclosure. For example, diagram 300B shows Pages 310-330 and a timing diagram showing Commands 340 and 350 and tCBSY 360-1 through 360-3, similar to pages 310-430 and commands 340 and 350 and tCBSY 360-1 through 360-3 described above with reference to FIG. 3A. Diagram 300B further shows Get Feature command 370B and block switching information 380B. In some embodiments, Get Feature command 370B designates feature address 7Fh and subfeature parameter P4. In some embodiments, block switching information 380B includes a Set Feature command designating feature address 7Fh and subfeature parameter P1. In some embodiments, block switching information 380B includes a prefix command. In some embodiments, block switching information 380B includes an address cycle. Further details regarding block switching information 380B will be described below with reference to FIG. 4.

In contrast to diagram 300A of FIG. 3A, as shown in diagram 300B of FIG. 3B, Command 350 is received (e.g., added to a queue) during a background operation to write data to Block A. The resulting delay 315B reflective performance loss is less than delay 315A of FIG. 3A. Accordingly, data writes to Page 310B can commence after delay 315B, which is a shorter delay than a delay that would be observed if the system had to wait for the background operation to be completed before receiving Command 330. Thus, detecting block switching during the performance of a background operation can reduce performance loss. Further details regarding detecting block switching during a background operation to improve sequential write performance will now be described below with reference to FIG. 4.

Figure 4:
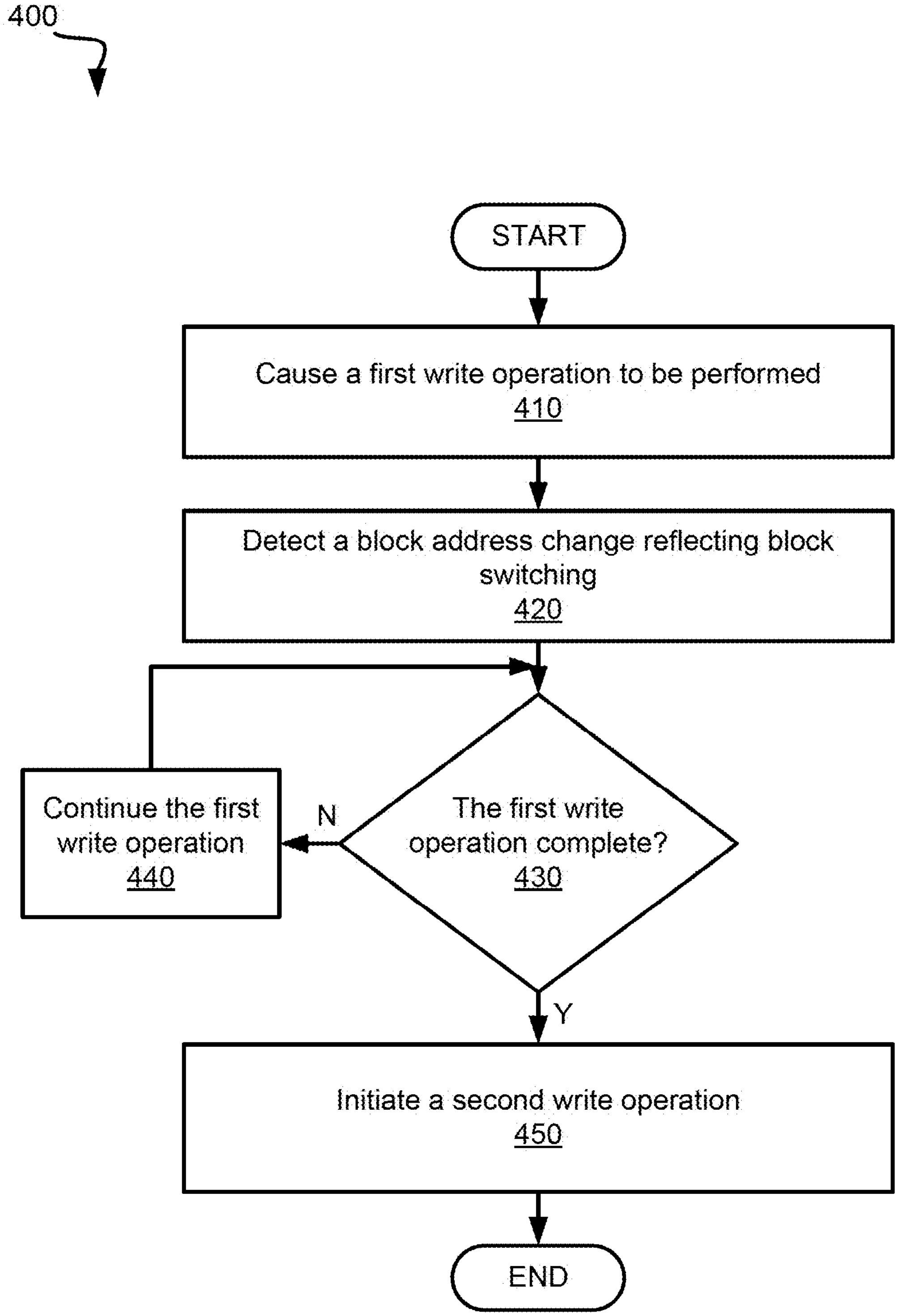
FIG. 4 is a flow diagram of an example method to detect block switching during background operations to improve sequential write performance, in accordance with some embodiments of the present disclosure.

FIG. 4 illustrates a flow diagram of an example method 400 to detect block switching during background operations to improve sequential write performance, in accordance with some embodiments of the present disclosure. Method 400 described with respect to FIG. 4 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, method 400 is performed by the block switch component 137 of FIG. 1A-B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, a first write operation is performed. For example, the processing logic (e.g. block switch component 137) at operation 410 can cause a first write operation to be performed to write data to a first cache block of a memory array, such as memory array 104. Illustratively, the first write operation is Block A—Page N+1 of FIG. 3B. The memory array can be included in a memory sub-system (e.g., memory sub-system 110 of FIGS. 1A-1B) coupled to a host system (e.g., host system 120 of FIG. 1A), and the data can include host data received by the memory sub-system from the host system. In some embodiments, the first cache block is an SLC block. In some embodiments, the first cache block is an MLC block. In some embodiments, the first cache block is a TLC block. In some embodiment, the first cache block is a QLC block.

At operation 420, a block address change reflecting block switching is detected. For example, processing logic at operation 420 can detect a block address change reflecting block switching to write the host data to a second cache block of the memory array 104. In some embodiments, the second cache block is an SLC block. In some embodiments, the second cache block is an MLC block. In some embodiments, the second cache block is a TLC block. In some embodiment, the second cache block is a QLC block.

More specifically, the block address change can be detected during the first write operation, which corresponds to a background operation. For example, the memory array (e.g., die) can be in a non-idle state (e.g., RDY=1 and ARDY=0). In some embodiments, detecting the block address change includes adding, to a queue, a command to perform a second write operation to write the data to the second cache block. For example, the command to perform the second write operation can be received from a memory sub-system controller (e.g., memory-subsystem controller 115 of FIGS. 1A-1B). Illustratively, the second write operation is Block B—Page N+2 of FIG. 3B.

Various methods can be used to detect the block address change. In some embodiments, detecting the block address change includes the local media controller receiving, from a source external to the memory device, information indicative of the block address change. For example, the source external to the memory device can be the memory sub-system controller. In some embodiments, receiving the information indicative of the block address change includes receiving a Set Feature command. The Set Feature command can modify a subfeature parameter at a feature address indicated by the Set Feature command. More specifically, a Set Feature command can be defined by a set of bits, and at least one bit of the set of bits can be used to indicate a block address change. Illustratively, a bit value of 1 can indicate a block address change, and a bit value of 0 can indicate no block address change.

In some embodiments, receiving the information indicative of the block address change includes receiving a prefix command. More specifically, the prefix command may be sent by the memory sub-system controller when there is a block address change.

In some embodiments, receiving the information indicative of the block address change includes receiving address cycle information. More specifically, the address cycle information can indicate an extra address cycle or a bit within a current address cycle that is unused, which can indicate a block address change. Illustratively, the information indicative of the block address change is information 380B of FIG. 3B.

In some embodiments, detecting the block address change includes the local media controller detecting the block address change internally within the memory device. For example, the local media controller can detect the block address change internally within the memory device by performing a block address comparison. More specifically, the local media controller can store a current block address for a current write operation, and compare the current block address with a subsequent block address for a subsequent write operation to determine whether a block address change exists. An illustrative example of detecting a block address change during a background operation (e.g., the first write operation) are described above with reference to FIG. 3B.

At operation 430, it is determined whether the first write operation is complete. For example, processing logic at operation 430 can determine whether the first cache block is fully written. If not, at operation 440, the first write operation is continued. For example, processing logic at operation 440 can cause the first write operation to continue to write data to the first cache block.

If the first write operation is complete (e.g., the first cache block is fully written), then a second write operation is initiated at operation 450. For example, processing logic at operation 350 can initiate a second write operation to write the data to the second cache block.

In some embodiments, the first cache block stores data having a first access type wherein the second cache block stores data having a second access type different from the first access type. For example, the data stored on the first cache block can include hot data (e.g., more frequently accessed data) and the data stored on the second cache block can include cold data (e.g., less frequently accessed data). As another example, the data stored on the first cache block can include cold data and the data stored on the second cache block can include hot data.

By enabling the detection of block switching during a background operation, full sequential write performance improvement is available when the memory device is in a non-idle state (e.g., RDY=1 and ARDY=0) regardless of the second write operation being performed with respect to the same block address or a different block address. Further details regarding operations 410-450 are described above with reference to FIGS. 1A and 3B.

Figure 5:
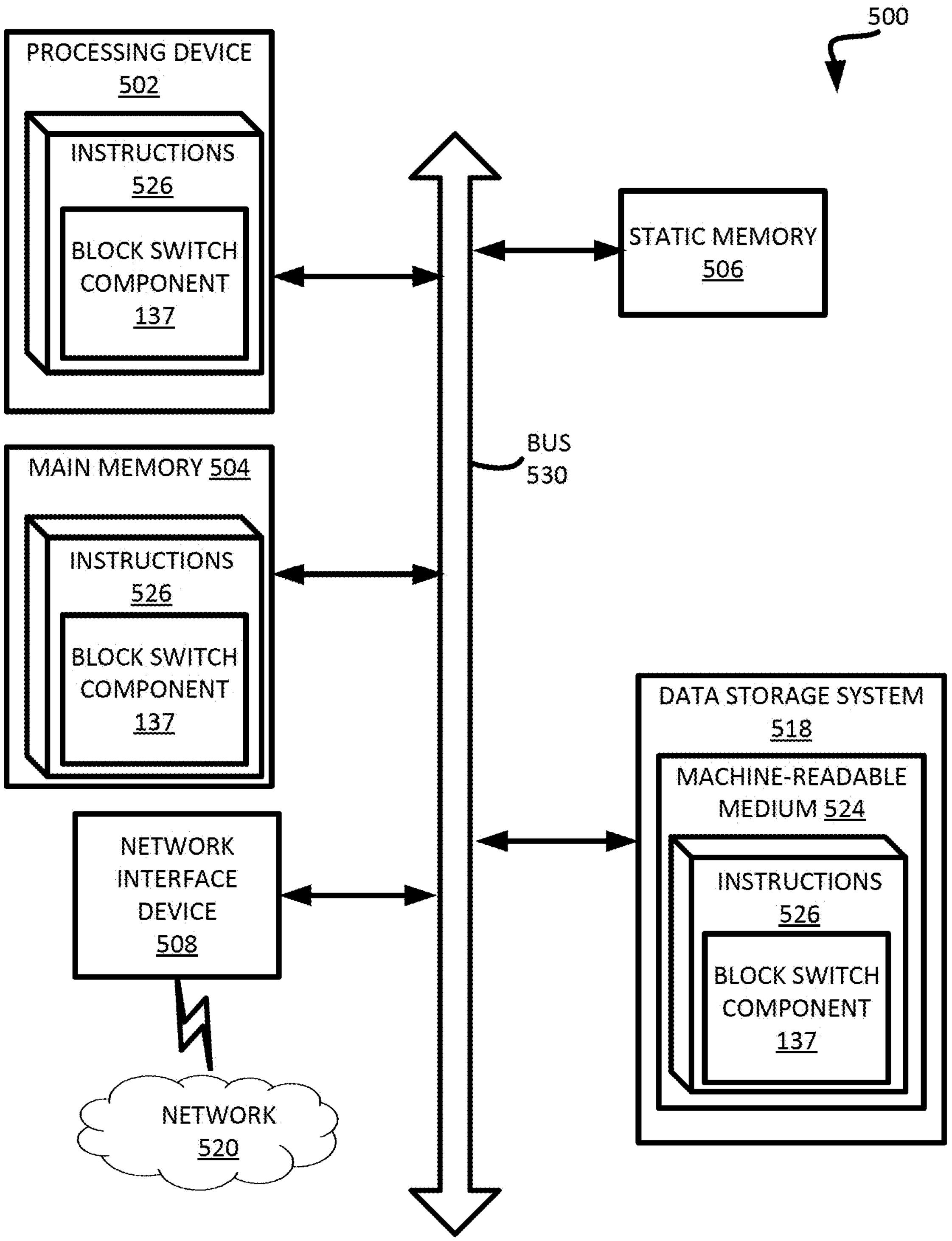
FIG. 5 illustrates an example block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to the block switch component 137 of FIGS. 1A-B). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or RDRAM, etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 626 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1A.

In one embodiment, the instructions 526 include instructions to implement functionality corresponding to a block switch component (e.g., the block switch component 137 of FIGS. 1A-B). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory device comprising:

a memory array; and control logic, operatively coupled to the memory array, to perform operations comprising:

causing a first write operation to be performed to write host data to a first cache block of the memory array;

detecting, while the first write operation is being performed, a block address change reflecting block switching to write the host data to a second cache block of the memory array;

after detecting the block address change, determining whether the first write operation is complete; and in response to determining that the first write operation is complete, initiating a second write operation to write the host data to the second cache block.

2. The memory device of claim 1, wherein detecting the block address change comprises receiving, from a memory sub-system controller, information indicative of the block address change.

3. The memory device of claim 2, wherein receiving the information indicative of the block address change from the memory sub-system controller comprises receiving a Set Feature command.

4. The memory device of claim 2, wherein receiving the information indicative of the block address change comprises receiving a prefix command.

5. The memory device of claim 2, wherein receiving the information indicative of the block address change comprises receiving address cycle information.

6. The memory device of claim 1, wherein detecting the block address change comprises performing a block address comparison.

7. The memory device of claim 1, wherein the first cache block stores data having a first access type, and wherein the second cache block stores data having a second access type different from the first access type.

8. A method comprising:
- causing, by a processing device, a first write operation to be performed to write host data to a first cache block of a memory array of a memory device;
- detecting, by the processing device while the first write operation is being performed, a block address change reflecting block switching to write the host data to a second cache block of the memory array;
- after detecting the block address change, determining, by the processing device, whether the first write operation is complete; and
- in response to determining that the first write operation is complete, initiating, by the processing device, a second write operation to write the host data to the second cache block.

9. The method of claim 8, wherein detecting the block address change comprises receiving, from a memory sub-system controller, information indicative of the block address change.

10. The method of claim 9, wherein receiving the information indicative of the block address change from the memory sub-system controller comprises receiving a Set Feature command.

11. The method of claim 9, wherein receiving the information indicative of the block address change comprises receiving a prefix command.

12. The method of claim 9, wherein receiving the information indicative of the block address change comprises receiving address cycle information.

13. The method of claim 8, wherein detecting the block address change comprises performing a block address comparison.

14. The method of claim 8, wherein the first cache block stores data having a first access type, and wherein the second cache block stores data having a second access type different from the first access type.

15. A non-transitory computer-readable storage medium comprising instructions that, when executed by a processing device, cause the processing device to perform operations comprising:
- causing a first write operation to be performed to write host data to a first cache block of a memory array of a memory device;
- detecting, while the first write operation is being performed, a block address change reflecting block switching to write the host data to a second cache block of the memory array;
- after detecting the block address change, determining whether the first write operation is complete; and
- in response to determining that the first write operation is complete, initiating a second write operation to write the host data to the second cache block.

16. The non-transitory computer-readable storage medium of claim 15, wherein detecting the block address change comprises receiving, from a memory sub-system controller, information indicative of the block address change.

17. The non-transitory computer-readable storage medium of claim 16, wherein receiving the information indicative of the block address change from the memory sub-system controller comprises receiving a Set Feature command.

18. The non-transitory computer-readable storage medium of claim 16, wherein receiving the information indicative of the block address change comprises receiving a prefix command.

19. The non-transitory computer-readable storage medium of claim 16, wherein receiving the information indicative of the block address change comprises receiving address cycle information.

20. The non-transitory computer-readable storage medium of claim 15, wherein detecting the block address change comprises performing a block address comparison.

* * * * *